United States Patent [19]

Williamson

[11] Patent Number: 4,934,742
[45] Date of Patent: Jun. 19, 1990

[54] HYDRAULIC COUPLING

[75] Inventor: Nigel D. L. Williamson, Sheffield, England

[73] Assignee: NWD International, Inc., Fort Wayne, Ind.

[21] Appl. No.: 293,392

[22] Filed: Jan. 4, 1989

Related U.S. Application Data

[63] Continuation-in-part of Ser. No. 148,846, Jan. 27, 1988, abandoned.

[51] Int. Cl.⁵ .................................................. F16L 5/02
[52] U.S. Cl. .................................... 285/212; 285/220; 285/918
[58] Field of Search ................ 285/212, 220, 332.2, 285/332.3, 918

[56] References Cited

U.S. PATENT DOCUMENTS

| | | | |
|---|---|---|---|
| 494,801 | 4/1893 | Weber . | |
| 587,347 | 8/1897 | Waite . | |
| 2,110,825 | 3/1938 | Archer | 285/146 |
| 2,118,670 | 5/1938 | Green | 247/18 |
| 2,187,217 | 1/1940 | Winslow | 285/157 |
| 2,452,890 | 11/1948 | Wolfram | 285/123 |
| 2,493,996 | 1/1950 | Parmesan | 285/122 |
| 2,523,995 | 9/1950 | Parmesan | 285/122 |
| 2,661,965 | 12/1953 | Parmesan | 285/122 |
| 2,696,395 | 12/1954 | Ellis | 285/120 |
| 2,960,353 | 11/1960 | Woodling | 285/220 X |
| 3,003,795 | 10/1961 | Lyon | 285/212 |
| 3,074,748 | 3/1961 | Ulrich | 285/347 |
| 3,151,896 | 10/1964 | Kody | 285/220 |
| 3,160,426 | 12/1964 | Faeser | 285/95 |
| 3,240,515 | 3/1966 | Schmohl | 285/212 |
| 3,273,917 | 9/1966 | Chakroff | 285/263 |
| 3,395,934 | 8/1968 | Rosan et al. | 285/23 |
| 3,850,456 | 11/1974 | Honback et al. | 285/212 |
| 4,458,925 | 7/1984 | Raulins et al. | 285/332.2 |
| 4,458,926 | 7/1984 | Williamson | 285/332.3 |
| 4,489,963 | 12/1984 | Raulins et al. | 285/350 |
| 4,572,551 | 2/1986 | Jaquette | 285/355 |

FOREIGN PATENT DOCUMENTS 1086073 2/1955 France .

*Primary Examiner*—Dave W. Arola
*Attorney, Agent, or Firm*—Jeffers, Hoffman & Niewyk

[57] ABSTRACT

A fluid coupling assembly particularly adapted for connecting hydraulic conduits to the ports of a fluid manifold. The coupling comprises a male member which is threadedly connected to the port and which includes tapered locking surfaces on the male and female members, respectively, that are in tight frictional engagement when the male member is threaded into the female member. An O-ring is positioned in a pocket and disposed between the threads and the tapered locking surfaces to isolate the locking surfaces from hydraulic fluid, thereby ensuring a dry, frictional wedge lock. The O-ring is of a size that permits it to move axially in the pocket. In a modified embodiment of the coupling, there is provided an adjustable fitting which includes a lock nut having a skirt portion that is wedged into the tapered O-ring pocket.

37 Claims, 2 Drawing Sheets

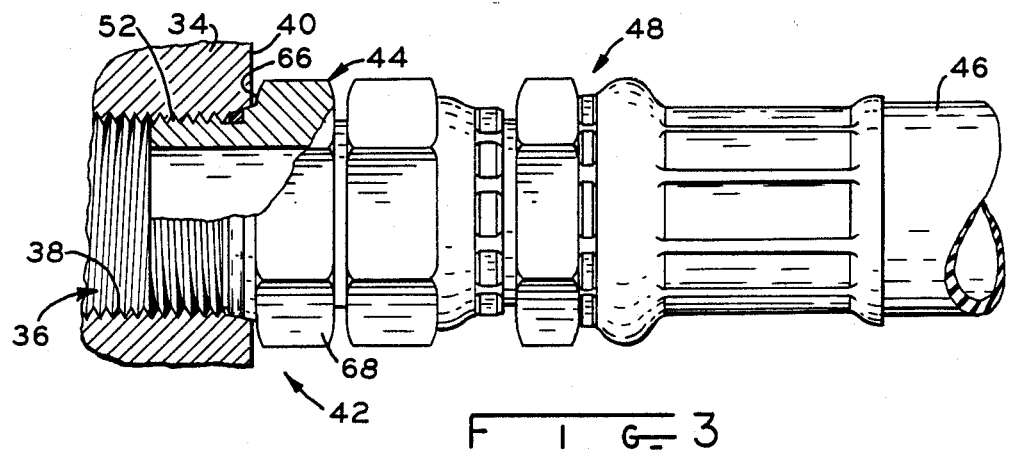
FIG. 3
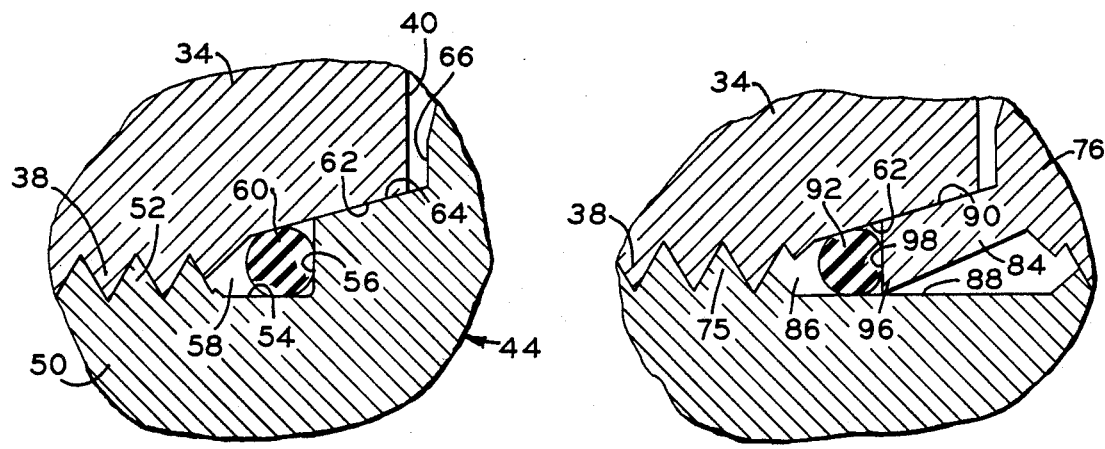
FIG. 4
FIG. 6
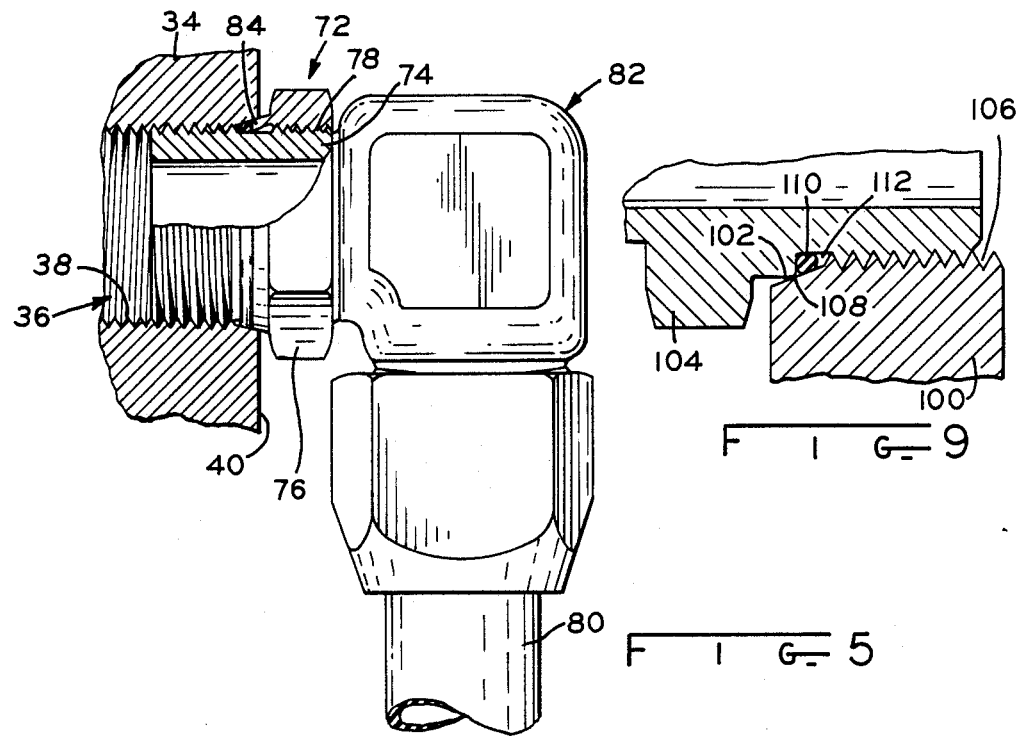
FIG. 5
FIG. 9

HYDRAULIC COUPLING

CROSS-REFERENCE TO RELATED APPLICATION

This is a continuation-in-part of application Ser. No. 148,846, filed Jan. 27, 1988 now abandoned.

BACKGROUND OF THE INVENTION

The present invention relates to fluid couplings, and in particular to couplings which are used in high pressure hydraulic environments, as encountered on machine tools, agricultural and construction equipment and the like.

For many years, the hydraulics industry has relied on hydraulic couplings for use in manifolds, pump housings and control units, that comply with the SAE J514 standard. These couplings utilize an O-ring, and are known in the industry as O-ring boss fittings. Although the O-ring boss fitting is significantly better than the metal-to-metal couplings used elsewhere in hydraulic systems, and functions well in lower pressure environments, current hydraulic applications utilize significantly higher pressures, and the application of hydraulics to the robotics and other environmentally sensitive applications dictates that all hydraulic couplings be leak free.

A major reason for the failure of certain prior art O-ring fittings is the rotational loosening of threads which occurs under conditions of high pressure and vibration. During this movement, a gap between the back face of the hydraulic fitting and the front face of the hydraulic port is opened up, which eventually leads to the O-ring material being extruded under pressure into the interface. FIG. 1 illustrates a prior art O-ring boss fitting wherein the manifold 12 has a port 14 therein which is provided with internal threads 16 that are threadedly connected to the external threads 18 of fitting 20. As will be seen, O-ring 22 is received within an undercut groove 24 in fitting 20 and fills substantially all of the space therein. As the fitting 20 is screwed into port 14, O-ring 22 is compressed and becomes, in all respects, another solid component, incapable of responding to pressure differentials within the interface area. Even in the case where the O-ring may not fill the entire space but fills a very high percentage of the space, the O-ring will be incapable of experiencing any significant axial movement and will function similarly to the case where the O-ring substantially fills the entire space.

FIG. 2 illustrates what happens when fitting 20 is subjected to conditions of pressure and vibration. As will be seen, the rotation of threads 16 and 18 creates a gap 26 between hexagonal collar 28 of fitting 20 and the face 30 of manifold 12. As hydraulic pressure is exerted on O-ring 22, it is urged outwardly and a portion 32 thereof will be extruded through gap 26. When the hydraulic pressure is subsequently released, the extruded portion 32 of the O-ring is nibbled by the abutting faces of the fitting 20 and manifold 12 as they settle back together. This occurs repeatedly upon application and relaxation of pressure, until failure eventually occurs. It is undesirable for the O-ring to be under high compressive forces, because this causes it to function as a packing material that is not capable of significant axial movement within the space.

Other prior art techniques have been attempted in an effort to provide improved hydraulic sealing. For example, the European industry has utilized bonded seals, which comprise a metal washer to which is bonded a rubber washer of special cross-sectional shape, wherein the metal washer provides a backup to the rubber sealing member. Although such bonded seals work effectively in many applications, they are relatively expensive to manufacture, and the seals are difficult to use, often resulting in poor assembly and subsequent field failure. Another attempted solution is the use of O-ring boss components which are made with additional threads, whereby the additional friction afforded helps to resist rotational loosening of components. This is an additional cost, and has not proved to be as effective as the industry demands. A further type of prior art seal comprises an O-ring having a resilient spring as its core covered with a softer outer layer. This type of O-ring is not readily deformable and is designed to seal through the action of radial forces caused by an interference fit between the O-ring and the surfaces between which it is seated.

In prior art fittings, the O-ring seal is typically located between the hydraulic fluid within the system and the threads of the hydraulic fitting, thereby exposing the threads to the ambient atmosphere. This leaves the threads exposed to possible corrosion by electrolytic action and atmospheric attack, thereby making it difficult to disconnect the fitting. Should this corrosion occur at the interface between the hydraulic conveyance system and the manifold to which it attaches, it would be impossible to disassemble the system for repair or maintenance without damaging expensive components, such as the pumps and controls into which the connecting ports are machined. The problem of thread corrosion can be eliminated by locating the threads in communication with the hydraulic fluid. However, a major reason for the failure in service of an O-ring boss fitting is the loosening of the threads which occurs under conditions of pressure and vibration, and this situation is worsened by the lubrication of the threads by the hydraulic fluid within the system.

Current standard fittings include a thread which mates with the port entry thread, the former being undercut to accept the O-ring. Behind the O-ring there is a flat face metal-to-metal abutment, with the interface being perpendicular to the axis of the fitting. This face-to-face abutment does not lock the components together, and under conditions of vibration in combination with pressure, there is a loosening which takes place between the fitting and the port, which leads to failure of the coupling. A similar situation is present in the adjustable version of the prior art fitting, wherein a lock nut and washer provide the backup to the O-ring. The adjustable version of the standard fitting is even more prone to failure than the straight version, due to the fact that under pressure, the washer tends to deform slightly, thereby allowing a small gap to occur between its inner diameter and the outer diameter of the thread undercut against which it should abut with an interference fit. This creates two possible leak paths and a greater incidence of failure.

SUMMARY OF THE INVENTION

The fluid coupling according to the present invention, in one form thereof, overcomes the problems and disadvantages of the prior art by providing a fluid coupling wherein metal-to-metal contact is made between a tapered surface on either the port or fitting, which creates a wedge lock effect between these components and the elasticity of the metal components maintains the coupling assembly under tension. In order to enhance the frictional forces preventing rotation of the fitting, an O-ring is positioned between the threads and the tapered surfaces. The O-ring is of a size and durometer permitting it to move axially within the pocket formed behind the tapered locking surfaces. This maintains the surfaces in a dry condition because they are isolated from the hydraulic fluid. Preferably, the interface between the fitting and port comprises a tapered, annular face, which increases the amount of frictional force resisting movement of the fitting. Alternatively, the interface can comprise an annular line contact, which results from one of the surfaces being slightly arcuate and engaging either a tapered, annular flat surface or a corner portion of the fitting. The threads of the fitting are in communication with the hydraulic system, and are therefore protected from corrosion by the ambient atmosphere. The O-ring functions to prevent fluid from passing to the lock area formed by the face-to-face metal surfaces, the lock area remaining unlubricated.

The fitting comprises a pair of tapered surfaces, having an angle of 7°-45° relative to the axial direction, in front of which is trapped the O-ring in an undercut region on the fitting. A more preferred range of angles is 10°-35°, and the most preferred range is 10°-20°. If desired, the angle of the male member can be 1° smaller than the angle of the tapered surface on the female member so that a line contact can be achieved. As opposed to the prior art, the O-ring is significantly smaller, and is capable of slight axial movement within the O-ring pocket formed by the undercut groove in response to hydraulic pressure. For example, the ratio of the volume of the pocket that is not occupied by the O-ring to the volume of the O-ring is greater than 0.5. The O-ring is also of a durometer that permits it to deform into sealing engagement against a corner of the pocket where the interface between the tapered locking surfaces meets the pocket.

It is recognized that under conditions of extreme pressure and vibration, such as may be encountered in the most aggressive of environments, the integrity of the lock provided by the tapered wedge could be overcome, and loosening could occur, thereby generating an axial gap. However, since the surfaces mate at an angle significantly less than 90° to the axis, a certain degree of axial movement of the fitting relative to the port will result in the creation of a gap which is only a fraction of the axial movement. This allows little, if any, extrusion of the O-ring into the gap as compared with certain prior art fittings wherein the gap is quite large and is directly proportional to the amount of axial movement. Upon relaxation of the hydraulic pressure, there is enough space within the O-ring pocket to allow the O-ring to retract away from the tapered faces, thereby eliminating nibbling of the O-ring as is the case with the prior art. Furthermore, since the faces are tapered, the axial movement of the tapered face on the fitting toward the tapered face on the port tends to push the O-ring back into the pocket, rather than pinching it as in the prior art. Because the O-ring is of a smaller size, it is able to retract axially within the pocket, whereas in the prior art fittings, the O-ring is compressed to a degree where it occupies substantially the entire pocket and, once it extrudes through the gap, it is not able to retract back into the pocket.

In an alternative embodiment of the invention, there is provided an adjustable-type fitting wherein the tapered locking surface is provided by a lock nut having a tapered annular skirt that extends into the O-ring pocket. By way of explanation, the straight-type fitting is used where a connection is required perpendicularly the face of the port, and the adjustable fitting is utilized to facilitate alignment of components which run parallel to the port faces or at some other angle thereto. The skirt portion of the adjustable fitting is wedged into the tapered O-ring pocket as the lock nut is threaded on the base portion of the fitting. The outer peripheral surface of the skirt forms the aforementioned metal-to-metal lock discussed earlier, and the inside corner of the skirt is swaged down onto the base portion of the fitting to provide a metal-to-metal engagement on the inner periphery of the skirt.

The invention relates to a fluid coupling which, in one form thereof, comprises a female member having an outer face and an axial bore extending inwardly from the outer face and adapted to be in communication with fluid under pressure. For example, the female member could comprise the port on the face of a manifold on hydraulic equipment, such as a construction machine, industrial robot or the like. The bore has internal threads thereon and an internal annular tapered lock surface disposed between the threads and the outer face of the female member. A male member has a portion thereof disposed within the bore and has external threads thereon threadedly engaged with the internal threads of the female member. The male member comprises an annular external tapered lock surface in tight face-to-face contact with the internal tapered surface of the female member, and an annular undercut shoulder disposed between the external threads and the external tapered surface defining an annular O-ring pocket. An O-ring is disposed in the pocket, the O-ring preferably being of a size permitting the O-ring to move axially within the undercut pocket in response to fluid pressure.

In another form thereof, the invention is a fluid coupling assembly comprising a female member having an outer face and an axial bore extending inwardly from the outer face, the female member having an internal annular lock surface. A male member having a base element disposed within the bore is connected to the female member, the base element including an external surface in facing relationship with the internal annular surface and defining therewith a tapered annular pocket. The male member includes a lock nut element disposed around the base element and being threadedly connected thereto, the lock nut element including an annular skirt portion wedged into the tapered pocket. The annular skirt portion of the lock nut is capable of some deformation, although it is relatively hard, having a hardness of about 121 to 127 brinell. An O-ring is disposed in the pocket in engagement with the axial end of the skirt portion and is capable of axial movement within the pocket.

An advantage to the fluid coupling of the present invention is that the female port specifications and tolerances can remain essentially unchanged, and the improved male fitting will be interchangeable with current standard fittings.

The fluid coupling according to the present invention has been shown to resist pressures in excess of 30,000 psi. The ability to resist pressures of this magnitude is surprising and unexpected when compared to the performance of other hydraulic fittings that are currently commercially available.

BRIEF DESCRIPTION OF THE DRAWINGS

FIG. 3 is an elevational view, partially in section, of one embodiment of the present invention;

FIG. 4 is an enlarged, fragmentary sectional view of the fluid coupling of FIG. 3;

FIG. 5 is an elevational view of a modified embodiment of the present invention;

FIG. 6 is an enlarged, fragmentary sectional view of the hydraulic coupling of FIG. 5;

FIG. 9 is an enlarged, fragmentary sectional view of another embodiment of the invention.

DETAILED DESCRIPTION OF THE PREFERRED EMBODIMENTS

Figure 1:
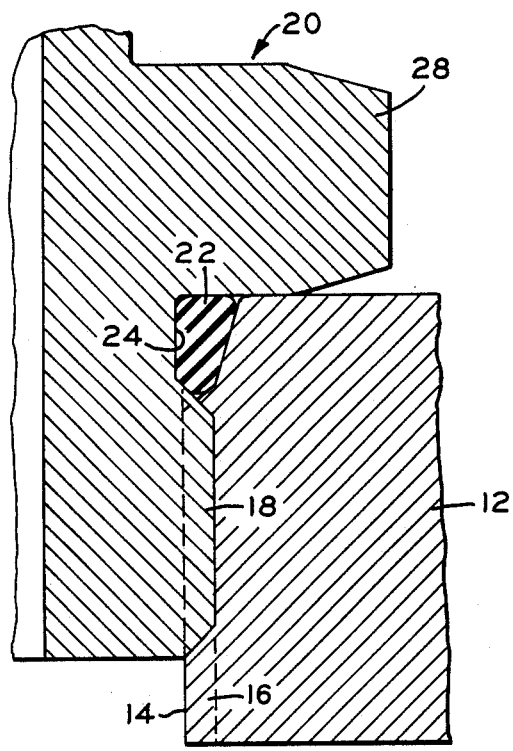
FIG. 1 is an enlarged, fragmentary sectional view showing a prior art O-ring boss fitting in its normal, tightened state.

With particular reference now to FIGS. 3 and 4, a straight-type hydraulic coupling according to the present invention is shown. Female member 34, which may be a fluid manifold on an item of hydraulic equipment, such as a construction machine or an industrial robot, includes an axial bore 36 having internal threads 38 therein. Although the fluid coupling of the present invention is particularly useful for making hydraulic connections to ports, the invention could also be applied to hose couplings and other hydraulic connections.

Male member 44 comprises a base portion 50 having external threads 52 thereon and having an undercut groove 54 formed by undercut shoulder 56 that functions as an O-ring pocket 58 in which is received O-ring 60. A tapered, annular lock surface 62, preferably having an angle of 10°-20° with respect to the axis of the fitting, extends from threads 38 to the outer face 40 of female member 34. As shown, tapered surface 62 extends into pocket 58 past O-ring 60. Although a range of 10°-20° is preferred, the angle of the taper could lie within a range of 10°-35° or 7°-45°, depending upon the configuration of the female member. A similarly tapered lock surface 64 on male member 44 extends from shoulder 56 to surface 66 on the hexagonal collar portion 68 of male fitting 44. Preferably, there is a gap between surfaces 40 and 66, which provides sufficient tolerance for the male member 44 to be screwed into female member 34 such that surfaces 62 and 64 come into tight abutting relationship, thereby generating the necessary frictional forces to prevent fitting 44 from loosening.

O-ring 60 is preferably homogeneous and is made of an elastomeric and deformable material, such as synthetic rubbers including Nitrile, Butyle, Neoprene, silicone and the like, which are available from many sources, such as Precision Rubber and Apple Rubber in the United States, and Dowty in Europe. The preferred durometer for O-ring 60 is 70-90, which permits the O-ring to deform under hydraulic pressure and seal against the interface between male member 44 and female member 34. O-ring 60 is deformed but not compressed during assembly, and is of a size small enough to permit it to move axially within O-ring pocket 58 in response to the application and release of hydraulic pressure. As will be appreciated, hose 46 conducts hydraulic fluid under pressure through standard hose adaptor 48 and fitting 44 to manifold 34 through bore 36. The pressurized hydraulic fluid will leak past threads 38 and 52 and force O-ring 60 into the corner formed by shoulder 56 and the axially inner portion of tapered surface 62 and deforms to seal against the corner. This corner is located where the interface between surfaces, 62 and 64 meets O-ring pocket 58. Thus, O-ring 60 seals the frictional lock achieved by surfaces 62 and 64 from the hydraulic fluid, thereby ensuring that a dry wedge lock is achieved. The outer diameter of O-ring 60 is preferably smaller in diameter than the maximum diameter of the O-ring pocket between surfaces 54 and 62, which is defined by the maximum diameter of surface 62 contiguous with pocket 58. O-ring 60 is capable of axial movement within pocket 58 so that it is able to easily move into the corner formed between surface 62 and shoulder 56 and then retract away from that corner when hydraulic pressure is released. The ratio of the volume of O-ring pocket 58 that is not occupied by O-ring 60 ($V_P$) to the volume of O-ring 60 ($V_O$) is greater than about 0.4 and is preferably greater than about 0.5. For example, the ratio $V_P/V_O$ can be from about 0.5 to 0.9, and a preferred range of $V_P/V_O$ of about 0.55 to 0.82 has been found to be very effective in permitting O-ring 60 to move axially and seal against the corner where the interface between surfaces 62 and 64 meets O-ring pocket 58. It is also preferred that the transverse cross-sectional dimension of the O-ring be reduced to not more than about 90% at the point of maximum distortion when the fittings are screwed together.

In a preferred form of the invention, there is a metal-to-metal wedge-type joint between surfaces 62 and 64 occurring within the first 0.050 in. of the lead in taper. A clearance of 0.025 in. between the hexagonal shoulder 66 of the male member and the face 40 of the port is desired to allow for better unit loading of the component mating surfaces during assembly.

Figure 2:
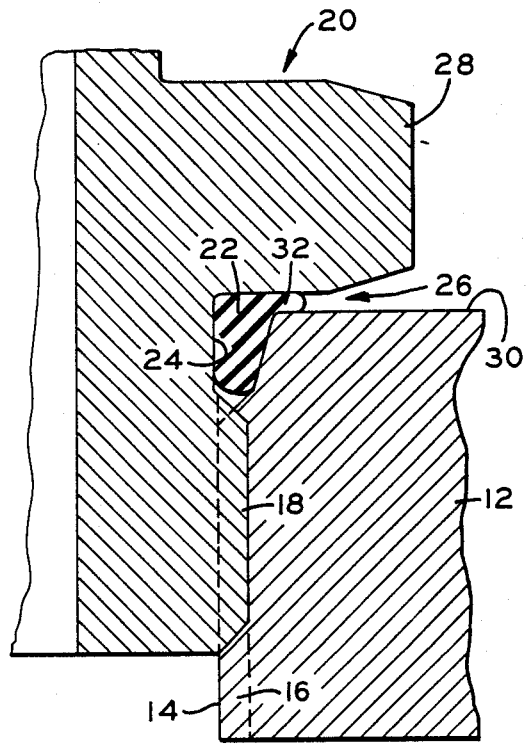
FIG. 2 is an enlarged, fragmentary sectional view of the fitting of FIG. 1 wherein the fitting has been subjected to hydraulic pressure and vibration.
Figure 7:
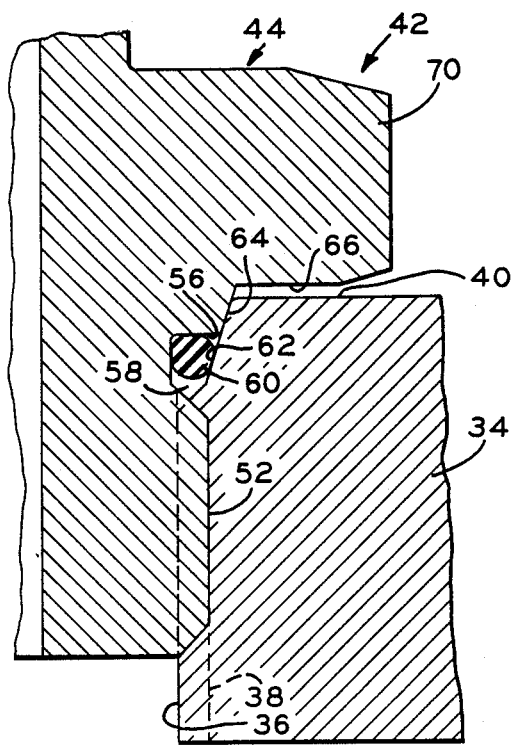
FIG. 7 is an enlarged, fragmentary sectional view of the coupling of FIG. 3 in its tightened state.
Figure 8:
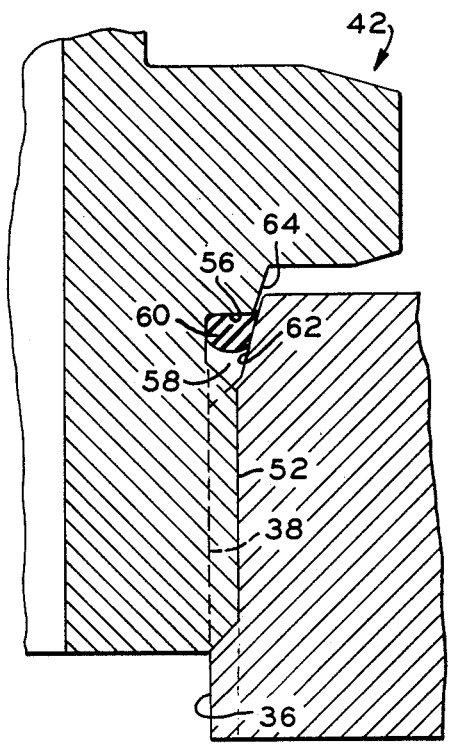
FIG. 8 is an enlarged, fragmentary sectional view of the fitting of FIG. 7 wherein the fitting has been subjected to excessive hydraulic pressure and vibration, whereby loosening has occurred.

FIGS. 7 and 8 illustrate the action of hydraulic coupling 42 when the coupling is loosened by the application of excessive hydraulic pressure. FIG. 7 shows hydraulic coupling 42 in its normal, tightened condition wherein male member 44 has been threaded into bore 36 to the extent that lock surfaces 62 and 64 are in tight, frictional engagement with each other, thereby resisting loosening of male member 44. In this condition, O-ring 60 is only slightly deformed, yet there is sufficient room within O-ring pocket 58 to permit O-ring 60 to move axially. FIG. 8 illustrates coupling 42 in its loosened condition wherein excessive pressure and vibration have overcome the resistance to loosening provided by the lock, thereby causing a gap to be created between surfaces 62 and 64. The hydraulic pressure also forces O-ring 60 into the corner formed by surfaces 56 and 62, and may cause a portion of O-ring 60 to be extruded into the gap between surfaces 62 and 64. As can be appreciated, however, the gap is quite small and only a very small portion of the O-ring 60 will be extruded therethrough. Upon the release of hydraulic pressure, hydraulic coupling 42 assumes the shape shown in FIG. 7, and the sliding action of surfaces 62 and 64 will push O-ring 60 back into pocket 58 without clamping or nibbling a portion thereof, as is the case in the prior art coupling shown in FIG. 2. As can be appreciated, the width of the gap formed between surfaces 62 and 64 is much less than the increase in gap between surfaces 66 and 40, which represents the amount of axial movement.

FIGS. 5 and 6 show a modified, adjustable-type fluid coupling according to another embodiment of the invention. In this embodiment, the male member 72 comprises a base portion 74 having threads 75 engaged with threads 38 and having a lock nut 76 received on a second set of threads 78. Male member 72 is connected to hydraulic hose or tube 80 by means of a standard 90° adapter 82.

Lock nut 76 includes a skirt portion 84 preferably deformable and preferably having a slightly divergent shape in radial cross section as more clearly shown in FIG. 6 which extends into the tapered O-ring pocket 86 formed by external surface 88 on base portion 74 and the tapered surface 62 on port 34. Skirt 84 preferably has a hardness of about 121–127 brinell, which will permit it to deform slightly inwardly when nut 72 is tightened, yet will not cause excessive deformation, which would reduce the effectiveness of the lock. Skirt 84 includes an external annular surface 90 that preferably has the same degree of taper, or slightly less, as surface 62. To assemble the fluid coupling 72 shown in FIGS. 5 and 6, lock nut 76 is first threaded onto base portion 74, formed to conform with the port tapered surface 62, and O-ring 92 is inserted onto the undercut surface 88 formed in base portion 74. Then, base portion 74 is threaded into bore 36 until skirt 84 enters O-ring pocket 86. Then, lock nut 76 is threaded axially to the left as shown in FIG. 5 until annular surface 90 tightly abuts locking surface 62, and the corner 96 of skirt 84 is swaged against surface 88, thereby forming a very tight wedge lock, both between surfaces 62 and 90 and between corner 96 and surface 88. The function of O-ring 92 is the same as in the previous embodiment in that it seals against the corners formed by surfaces 62 and 88 and the end 98 of skirt 84. Once again, the frictional interfaces between surfaces 62 and 90 and between corner 96 and surface 88 are sealed from the lubricating hydraulic fluid that would leak past threads 75 and 38. Skirt 84 forms an acute angle with surface 88 that is much smaller than 90° and the structure of skirt 84 is such that it will resist deformation under the translated forces from O-ring 92 during pressurization. As illustrated, the inner end 98 of skirt 84 is designed in buttressed form to resist high pressures and the walls are straight and taper slightly from the flat face so as to resist deformation.

Although the annular surface-to-surface contact of the embodiments of FIGS. 3–8 is preferred, it is also possible to use an annular line contact seal as shown in FIG. 9. In this embodiment, male member 104 is provided with an annular corner surface 108 that is arcuate in axial planes intersecting the axis of the coupling. Thus, as male member 104 is threaded into the bore 106 of port 100, a corner 108 thereof is forced into tight frictional engagement with tapered annular surface 102, thereby providing a tight annular friction lock, which resists loosening. O-ring 110, which is of a size and shape that permits it to move axially within O-ring pocket 112, seals the interface between surfaces 102 and 108 in a fashion similar to that of the previously discussed embodiments. An arcuate-tapered port (not shown) could be utilized with this fitting or with the adjustable fitting of FIGS. 5 and 6.

For purposes of this application, the terms "thread means" and "threadedly" include the full helical threads as illustrated as well as other types of easy disconnect threads, such as bayonet or quarter twist interlock threads. Furthermore, whereas the O-ring is shown as having a circular cross-section, other O-ring shapes are also possible as long as they achieve the desired sealing on the internal side of the metal-to-metal interface. In the case of the various embodiments they may be modified to locate the arcuate sealing surface on the male member or to be further modified such that both surfaces are arcuate.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and falls within the limits of the appended claims.

What is claimed is:

1. A fluid coupling assembly comprising:
   a female member having an outer face and an axial bore extending inwardly from the outer face and adapted to be in communication with fluid under pressure, said bore having internal thread means therein and an internal annular tapered locking surface disposed between said thread means and said outer face,
   a male member having a portion disposed within said bore and having external thread means thereon threadedly engaged with said internal thread means of said female member, said male member comprising an annular external tapered locking surface in tight contact with said internal tapered locking surface to form an interface, said male member comprising an annular undercut shoulder disposed between said external thread means and said external tapered surface defining an annular O-ring pocket, said pocket including a tapered corner where said interface extends into said pocket, and
   an O-ring disposed in said pocket, said O-ring being of a durometer and size smaller in volume than said pocket permitting said O-ring to move axially in said pocket and deform into sealing engagement with said tapered corner in response to fluid pressure, said internal tapered surface extending into said pocket past said O-ring.

2. The coupling assembly of claim 1 wherein a portion of said internal tapered surface defines said pocket and the outer diameter of said O-ring is smaller than the maximum diameter of said internal annular tapered surface defining said pocket.

3. The coupling assembly of claim 2 wherein the ratio of volume $V_P$ of said pocket not occupied by said O-ring to the volume $V_O$ of said O-ring is greater than 0.4.

4. The coupling assembly of claim 1 wherein the ratio of volume $V_P$ of said pocket not occupied by said O-ring to the volume $V_O$ of said O-ring is greater than 0.4.

5. The coupling assembly of claim 4 wherein the ratio $V_P/V_O$ is greater than 0.5.

6. The coupling assembly of claim 4 wherein the ratio $V_P/V_O$ is between about 0.5 and 0.9.

7. The coupling assembly of claim 4 wherein the ratio $V_P/V_O$ is between about 0.55 and 0.82.

8. The coupling assembly of claim 1 wherein the transverse cross-sectional dimension of the O-ring is reduced to not more than about 90% by said tapered surfaces defining said pocket.

9. The coupling assembly of claim 1 wherein said O-ring is substantially homogeneous throughout its cross-section.

10. The coupling assembly of claim 1 wherein said O-ring has a durometer of about 70 to 90.

11. The coupling assembly of claim 1 wherein a portion of said internal tapered surface defines said pocket whereby said pocket tapers in the axial direction.

12. The coupling assembly of claim 1 wherein said male member comprises: a base element having said external thread means thereon, a second set of external thread means and a lock nut element threadedly engaged with the second set of thread means and including a skirt portion disposed within said female member bore, said external surface being on said skirt portion, and an end of said skirt portion forming said undercut shoulder and said O-ring pocket, said pocket further including a corner formed by said shoulder and male member and said O-ring in response to fluid pressure deforming into sealing engagement with both said corners.

13. The coupling assembly of claim 12 wherein said O-ring pocket is tapered and said skirt portion is wedged in said tapered O-ring pocket.

14. The coupling assembly of claim 1 wherein said external locking surface is tapered at an angle of 10° to 35° with respect to the axial direction.

15. The coupling assembly of claim 1 wherein the slope of said tapered locking surfaces relative to the axial direction is about 7° to 45°.

16. The coupling assembly of claim 1 wherein the slope of said tapered locking surfaces relative to the axial direction is about 10° to 20°.

17. The coupling assembly of claim 1 wherein one of said tapered surfaces is arcuate in any axial plane intersecting the axis of said bore.

18. The coupling assembly of claim 1 wherein said external locking surface is tapered at an angle of 10° to 20° with respect to the axial direction.

19. A fluid coupling assembly comprising:
a female member having an outer face and an axial bore extending inwardly from the outer face and adapted to be in communication with fluid under pressure, said bore having internal thread means therein and an annular internal locking surface disposed between said thread means and said outer face,
a male member having a portion disposed within said bore and having external thread means thereon threadedly engaged with said internal thread means of said female member, said male member comprising an annular external locking surface in tight contact with said internal locking surface to form an interface, said male member comprising an annular undercut shoulder disposed between said external thread means and said external locking surface defining an annular O-ring pocket,
said internal locking surface being tapered,
said pocket including a tapered corner where said interface extends into said pocket, and
an O-ring disposed in said pocket, said O-ring being of a durometer and size smaller in volume than said pocket permitting said O-ring to move axially in said pocket and deform into sealing engagement with said tapered corner in response to fluid pressure, said internal locking surface extending into said pocket past said O-ring.

20. The coupling assembly of claim 19 wherein: a portion of said internal tapered surface defines said pocket, and the outer diameter of said O-ring is smaller than the maximum diameter of said internal annular tapered surface defining said pocket.

21. The coupling assembly of claim 19 wherein the ratio of volume $V_P$ of said pocket not occupied by said O-ring to the volume $V_O$ of said O-ring is greater than 0.4.

22. The coupling assembly of claim 19 wherein the ratio $V_P/V_O$ is greater than 0.5.

23. The coupling assembly of claim 19 wherein the ratio $V_P/V_O$ is between about 0.55 and 0.82.

24. The coupling assembly of claim 19 wherein said internal locking surface is in tight engagement with a corner portion of said external locking surface.

25. A fluid coupling assembly comprising:
a female member having an outer face and an axial bore extending inwardly from the outer face, said female member having a tapered internal annular locking surface,
a male member having a base element disposed within said bore and means for connecting said base element to said female member, said base element including an external surface in facing relationship with said internal annular surface and defining therewith a tapered annular pocket,
said male member including a lock nut element disposed around said base element and being threadedly connected to said base element, said lock nut element including an annular skirt portion wedged into said tapered pocket and forming a corner with said tapered internal annular locking surface and with said external surface, and
an O-ring disposed in said pocket adjacent an axial end portion of said skirt portion, said O-ring being of a durometer and size smaller in volume than said pocket permitting said O-ring to move axially in said pocket and deform into sealing engagement with said corners in response to fluid pressure, said internal tapered locking surface extending into said pocket past said O-ring.

26. The coupling assembly of claim 25 wherein said skirt portion includes an outer locking surface that is tapered and in tight face-to-face contact with said tapered internal locking surface.

27. The coupling assembly of claim 26 wherein said internal and outer locking surfaces are equally tapered.

28. The coupling assembly of claim 25 wherein said skirt portion is deformable, whereby it can deform inwardly to tightly engage said base element external surface.

29. The coupling assembly of claim 28 wherein said skirt portion has a hardness of about 121 to 127 brinell.

30. The coupling of claim 25 wherein said means for connecting said base element to said female member includes external thread means on said base element.

31. The fitting of claim 25 wherein said skirt portion includes an annular inner corner portion which is adapted to make an annular line contact with said base member external surface.

32. The coupling assembly of claim 25 wherein a portion of said internal tapered surface defines said pocket and the outer diameter of said O-ring is smaller than the maximum diameter of said internal annular tapered surface defining said pocket.

33. The coupling assembly of claim 25 wherein the ratio of volume $V_P$ of said pocket not occupied by said O-ring to the volume $V_O$ of said O-ring is greater than 0.4.

34. The coupling assembly of claim 25 wherein the ratio $V_P/V_O$ is greater than 0.5.

35. The coupling assembly of claim 25 wherein the ratio $V_P/V_O$ is between about 0.55 and 0.82.

36. The coupling assembly of claim 25 wherein said O-ring has a durometer of about 70 to 90.

37. The coupling assembly of claim 25 wherein said skirt engages the external surface of said base element and forms an acute angle with said base element external surface that is much smaller than 90°.

* * * * *